United States Patent [19]

Hoar

[11] 4,316,361
[45] Feb. 23, 1982

[54] WATER SUPPORTED WIND ACTUATED POWER GENERATING ASSEMBLY

[76] Inventor: Russell A. Hoar, 6151 Vernon St., Long Beach, Calif. 90815

[21] Appl. No.: 223,348

[22] Filed: Jan. 8, 1981

[51] Int. Cl.³ .............................................. F03D 9/00
[52] U.S. Cl. .................... 60/398; 417/334; 290/55
[58] Field of Search ............... 60/398; 417/334, 337; 290/44, 55

[56] References Cited

U.S. PATENT DOCUMENTS

| | | | |
|---|---|---|---|
| 4,055,950 | 11/1977 | Grossman | 417/334 |
| 4,159,427 | 6/1979 | Wiedemann | 290/55 |
| 4,174,926 | 11/1979 | Hamrick et al. | 60/398 |
| 4,179,886 | 12/1979 | Tsubota | 60/398 |

FOREIGN PATENT DOCUMENTS

| | | | |
|---|---|---|---|
| 2807092 | 8/1979 | Fed. Rep. of Germany | 290/55 |
| 2812244 | 10/1979 | Fed. Rep. of Germany | 290/55 |
| 2843675 | 4/1980 | Fed. Rep. of Germany | 60/398 |
| 2373910 | 7/1978 | France | 60/398 |
| 52-11345 | 1/1977 | Japan | 60/398 |

*Primary Examiner*—H. Jay Spiegel
*Attorney, Agent, or Firm*—William C. Babcock

[57] ABSTRACT

A counterweighted elongate buoyant body that floats on the surface of the sea or a lake has at least one sail supporting mast extending upwardly therefrom as well as vanes that tend to maintain the sails substantially normal to the direction of movement of the wind. The buoyant body is by frame means maintained within the confines of a circular series of piles. The counterweight and means for pivoting each sail from a position normal to the direction of the wind to substantially parallel thereto cooperate to impart a transverse rocking motion to the buoyant body that has an eccentric transverse arcuate member depending therefrom that is engaged by a pair of rollers, as the transverse member moves relative to the pair of rollers a bellows is receprocated upwardly and downwardly to draw water into and discharge it from a check valve controlled confined space to a reservoir situated at a substantial distance above the surface of the body of water. Water discharges by gravity from the reservoir to a turbine or the like to power a generator to produce electricity for power purposes. Power means pivot the sails substantially parallel to the direction of the wind after the latter has rolled the buoyant body to a first position. The counterweight then rolls the buoyant body to a second position where upon the power means pivot the sails to positions substantially normal to the direction of the wind to start another power generating cycle.

4 Claims, 5 Drawing Figures

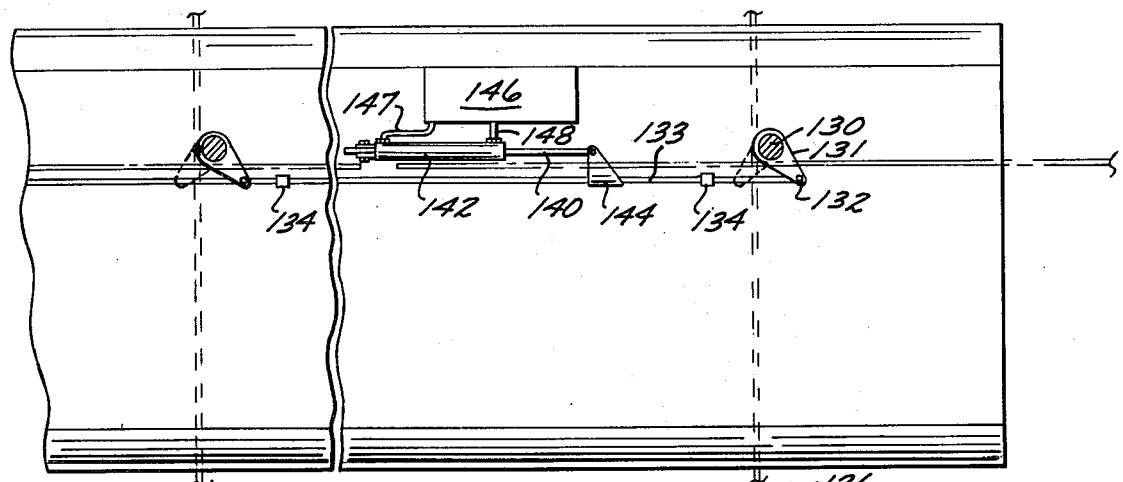
FIG. 3
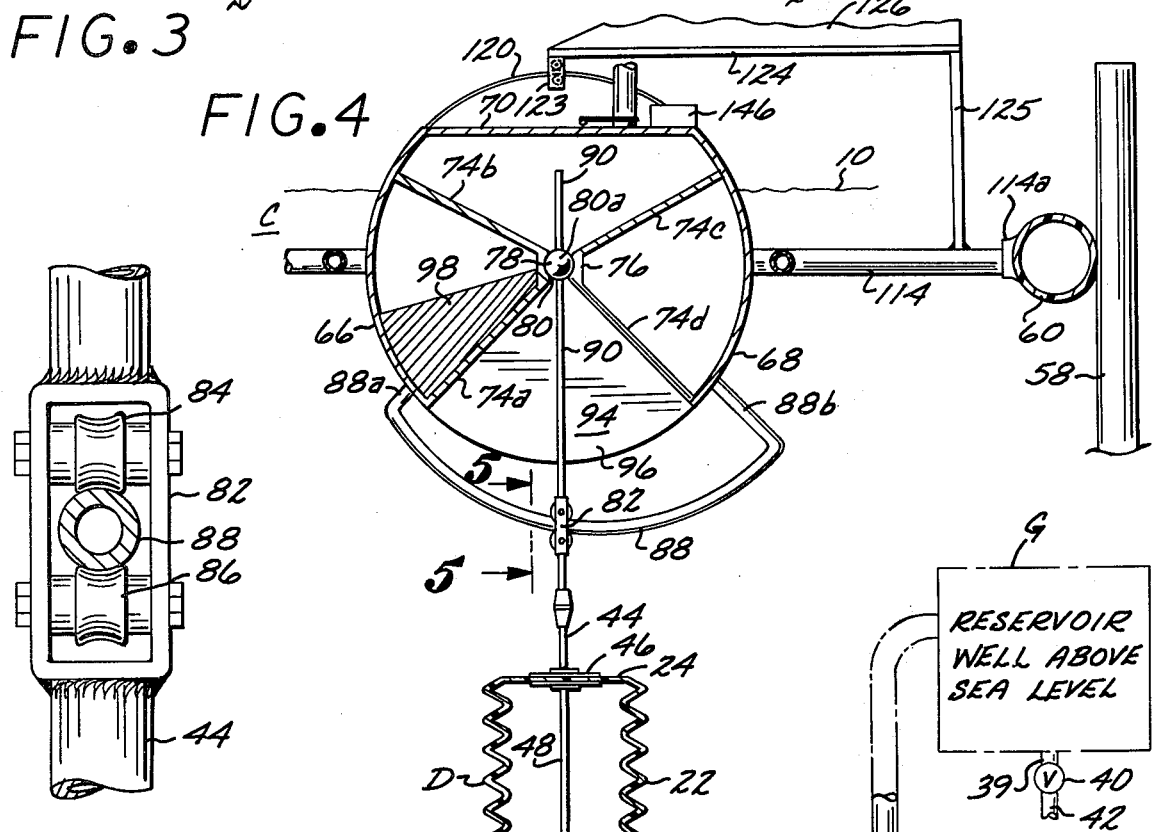
FIG. 4
FIG. 5
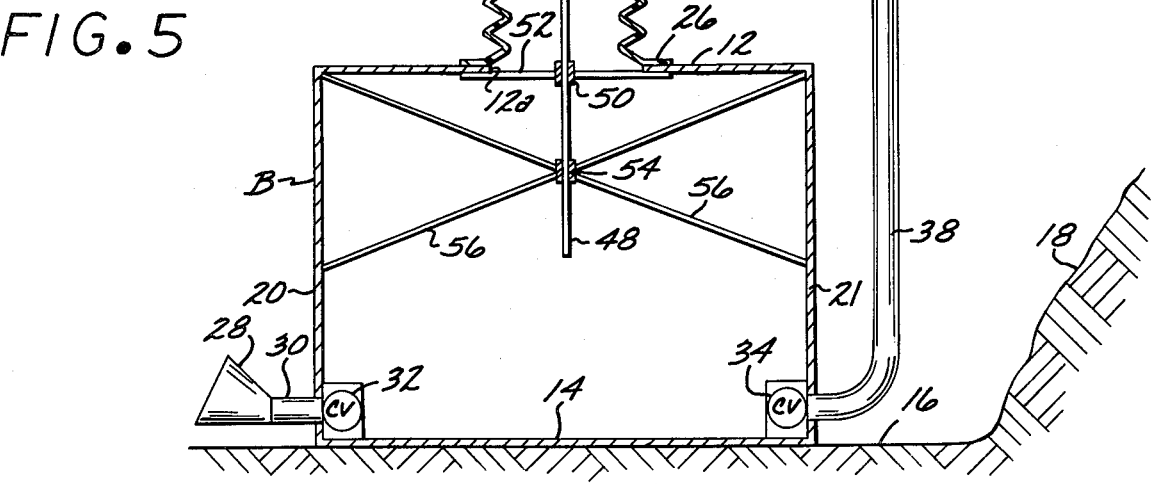

WATER SUPPORTED WIND ACTUATED POWER GENERATING ASSEMBLY

CROSS REFERENCE

Patent application Ser. No. 156,574 filed by applicant in United States Patent Office on June 5, 1980 entitled Electric Power Generating Assembly.

BACKGROUND OF THE INVENTION

1. Field of the Invention

Water Supported, Wind Actuated Power Generating Assembly.

2. Description of the Prior Art

Due to the developing shortage of fossil fuel, there is now an urgent need to develop alternate sources of power, that will either eliminate or drastically reduce the need for fossil fuel or natural gas to actuate the same. Various types of wind actuated devices have been proposed in the past and used to a limited extent, most of which are based on the wind mill concept.

A major object of the present invention is to provide an elongate, counterweighted, buoyant body, preferably of massive construction, that supports a number of rotatable, upwardly extending masts, each of which supports a sail, and the masts and sails being concurrently rotated in timed sequence to cooperate with the counterweight to impart a transverse rocking motion to the buoyant body as it floats on the sea or a lake adjacent the shore thereof. This rocking motion is utilized to pump water to an elevated reservoir from which it may discharge by gravity to actuate a turbine generator assembly to produce electricity, and the water after flowing through the turbine being returned to the body of water of which it initially formed a part.

Another object of the invention is to produce a wind actuated power producing device that may be fabricated from standard commercially available materials, is simple and easy to use, requires a minimum of maintenance attention, and utilizes a minimum of fossil fuel in the operation thereof.

SUMMARY OF THE INVENTION

A water reservoir is located at a substantial elevation on the shore adjacent a body of water such as a lake or the sea. The reservoir has a water supply conduit extending thereto. A water discharge line extends downwardly from the reservoir through which water discharges by gravity to power a turbine of the like that rotates an electric generator to produce electric power.

The water supply line is connected to a check valve controlled confined space situated below the surface of the sea or lake, which confined space is in communication with at least one upwardly extending bellow. The upper end of each bellows is connected to an actuating rod that has a pair of rollers that engage an eccentric arcuate member that extends downwardly from an elongate buoyant body that is confined within a pen defined by a sequence of piles arranged in circumferentially spaced relationship.

The buoyant body is counterweighted on a first side of the centered longitudinal axis thereof. A number of rotatable masts extend upwardly from the opposite side of the longitudinal axis, with each mast supporting a sail that may occupy both a first and second position.

Each sail when in a first position is substantially parallel to the longitudinal axis of the buoyant body. Vanes are mounted on the buoyant body, and tend to maintain the buoyant body when the sails are in a first position headed into the wind. The force of the wind when the sails are in the first position cause the buoyant body to rock in a first direction which results in each of the bellows moving downwardly to force water from the confined space into the water discharge conduit.

After the buoyant body has moved to a maximum first position, each sail is rotated to a second position substantially parallel to the direction in which the wind is blowing. The counterweight now causes the body to rock in a second direction to a second position, in which each bellows is vertically expanded to draw water into the check valve controlled confined space. The sails are now rotated to the first positions, with the buoyant body rocking from the second to the first position, and in so doing compressing the bellows vertically to discharge water from the confined space to the reservoir for electric power generating purposes.

BRIEF DESCRIPTION OF THE DRAWING

FIG. 3 is a fragmentary, enlarged top plan view of the device taken on the line 3—3 of FIG. 1;

FIG. 4 is a transverse cross sectional view of the device; and

FIG. 5 is an enlarged fragmentary side elevational view of the device taken on the line 5—5 of FIG. 4.

DESCRIPTION OF THE PREFERRED EMBODIMENT

Figure 1:
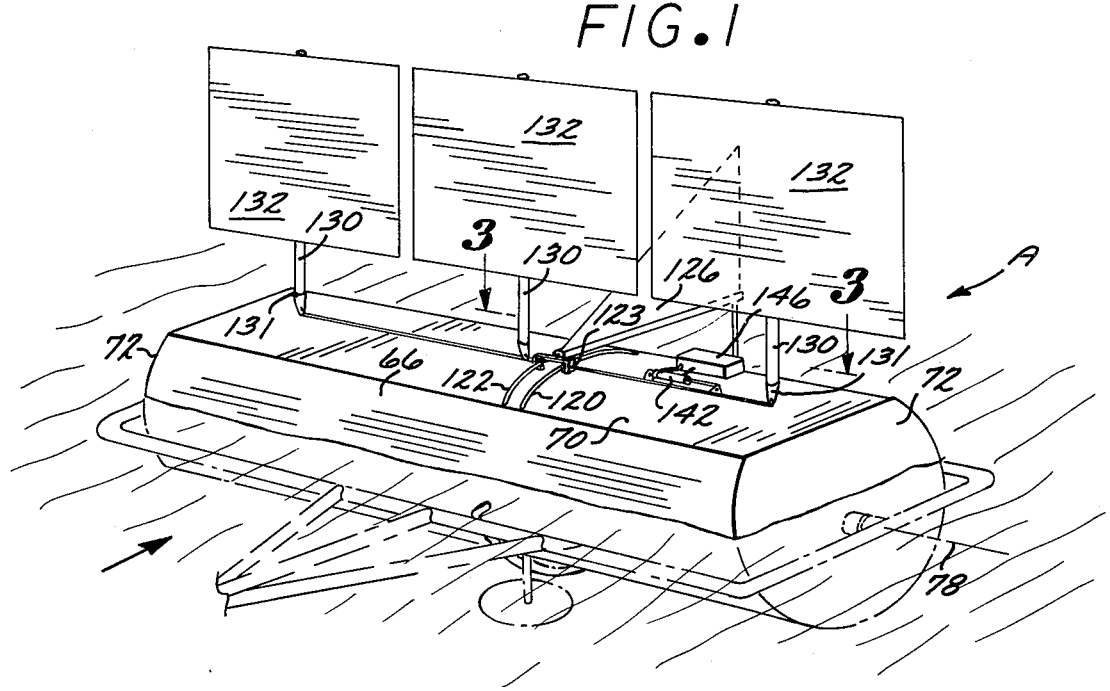
FIG. 1 is a perspective view of the water supported, wind actuated power generating assembly.

The water supported, wind actuated, power producing device A is shown in perspective in FIG. 1 and in cross section in FIG. 4.

A confined space defining enclosure B is provided that is located below the level 10 of a body of water C such as the sea or a lake.

The enclosure B is defined by a top 12, bottom 14, side walls 15, and a pair of first and second end walls 20 and 21. The top 12 has at least one opening 12a therein that is in communication with the interior of an upwardly extending bellows D.

Each bellows D is defined by a resilient vertically deformable material and includes a corrugated, cylindrical side wall 22 that has a flat top 24, and a ring shaped flange 26 that projects outwardly from the lower end thereof. Flange 26 is secured by conventional means to the portion of top 12 surrounding the opening 12a.

A strainer 28 is provided as shown in FIG. 4 that by tubular member 30 is connected to a first check valve 32 in first end wall 20 that allows water to flow into the enclosure B when a negative pressure is created therein. A second check valve 34 is located in or adjacent second end wall 21, and is in communication with a water supply conduit 38. The conduit 38 is in communication with a reservoir G located a substantial distance above the shore 18 of the body of water C that has a bottom 16, on which the enclosure B rests. A water discharge conduit 39 extends downwardly from a reservoir G to a turbine 40 to drive the same, with water returning from the turbine through a conduit 42 to the body of water C.

A plate 46 or other fastening means is secured to the top 24 of bellows D as shown in FIG. 4 and has an actuating rod 44 extending upwardly therefrom. A guide rod 48 extends downwardly from plate 46 to slidably engage a first bearing 50 that is supported in the center position of a spider 52 that spans the opening 12a as shown in FIG. 4.

A second bearing 54 is situated in enclosure B and held in co-axial alignment with first bearing 50 by suitable framing 56. Guide rod 48 also slidably engages second bearing 54.

Figure 2:
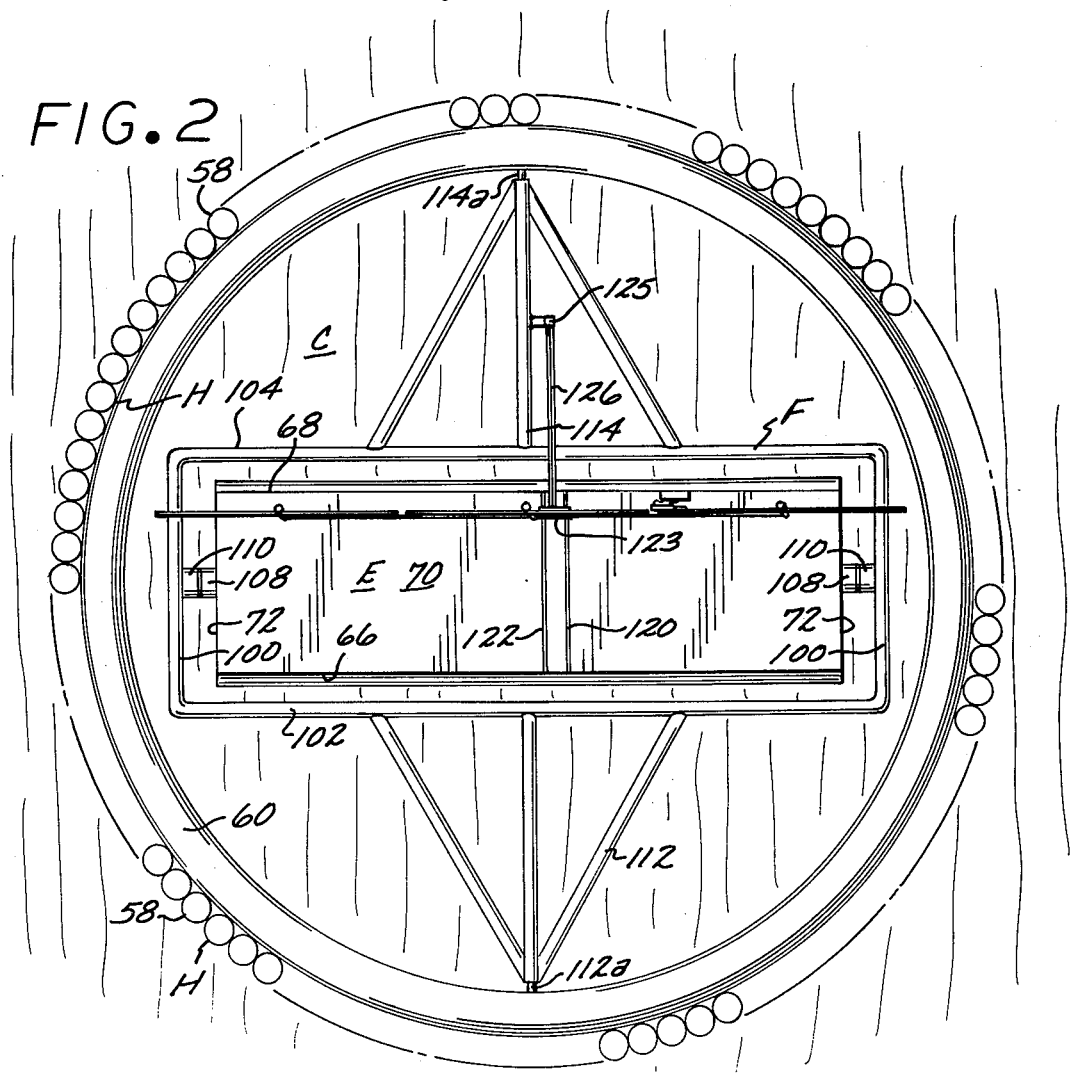
FIG. 2 is a top plan view of the device shown in FIG. 1.

A number of circumferentially disposed piles 58 are driven into the floor 16 of the body of water C, which piles are shown in FIG. 2, and define a cylindrical pen H that is filled with water from the body C as shown in FIG. 2. A rigid buoyant ring 60 floats on the portion of the water within the pen E, and may move vertically as well as rotate relative to the piles 58 that define the pen.

An elongate buoyant body E is provided, preferably of massive structure, and best seen in FIGS. 1 and 4, that is defined by first and second arcuate side walls 66 and 68, a flat top 70, and a pair of end walls 72. Radially extending reinforcing members 74a, 74b, 74c and 74d extend outwardly from a bearing 76 in the body E and are secured to the latter, which bearing is located on the longitudinal axis 78 of the body E, and rotatably supports a ball 80.

The actuating member 44 has a rectangular frame 82 mounted on the upper end thereof that rotatably supports upper and lower rollers 84 and 86 that are disposed on opposite sides of an eccentric arcuate member 88 that by first and second legs 88a and 88b is supported from the lower portion of body E, and directly below bearing 76. A first alignment member 90 extends upwardly from frame 82 and slidably engages a diametric bore 80a in ball 80. Two longitudinally spaced, inverted wedge shaped partitions 94 are secured to opposite sides of reinforcing members 74a and 74b and cooperate with bearing 76 to define an upwardly extending space 96 in body E that has the alignment member 90 disposed therein. The reinforcing members 74a have a counterweight 98 disposed adjacent thereto and inside body E, and to the left of longitudinal axis 78 as viewed in FIG. 4.

The buoyant body E is situated within the confines of a horizontal rectangular frame F that lies in substantially the same plane as buoyant ring 60. The frame F is defined by a pair of end pieces 100 and first and second side pieces 102 and 104. The end pieces 100 have stub shafts 108 projecting outwardly therefrom that engage bearings 110 supported from end pieces 100. First and second triangular shaped frames 112 and 114 extend outwardly from first and second side pieces 102 and 104 as shown in FIG. 2. The outer ends of first and second frames 112 and 114 are secured by rotatable connections 112a and 114a to the interior of the buoyant ring 60.

The top of body E as may be seen in FIGS. 1 and 2 support first and second longitudinally spaced parallel transverse arcuate rails 120 and 122 that are of the same radius of curvature as side walls 66 and 68. A rigid member 123 of conventional design is provided that removably engages the first and second rails 120 and 122. The member 123 has an elongate rigid support 124 projecting therefrom over the second frame 114, and the support 124 being secured to the second frame by an upright 125 as may be seen in FIG. 4. The support 124 has a vane 126 of substantial area projecting upwardly therefrom, with the vane being illustrated as of triangular configuration.

A number of upwardly extending masts 130 are rotatably supported from the top 70 of body E, and to the right of longitudinal axis 78 as viewed in FIG. 4. Each mast supports a sail 132 that is non-rotatably secured thereto.

East mast 130 has a horizontal lug 131 projecting outwardly therefrom that by a pivotal connection 132 is connected to a longitudinally movable actuating member 133 that is slidably supported on the top 70 by longitudinally spaced guides 134 in which it is slidably mounted. A piston rod 140 is mounted in a hydraulic cylinder 142 and the free end of the piston rod being pivotally connected by an assembly 144 of conventional structure to actuating member 133. A power driven hydraulic pump assembly 146 is illustrated as mounted on top 70, and by conventional valving (not shown) can concurrently through conduits 147 and 148 deliver hydraulic fluid under pressure to a desired interior end of the cylinder 142 and withdraw hydraulic fluid from the opposite end. Thus, the actuating member may be moved longitudinally on top 70, and with concurrent rotation of the masts 130 in either first or second positions.

From the previous description of the invention it will be seen that the vane 126 tends at all times to concurrently rotate the buoyant ring 60, frame F, and the buoyant body E within the pen defined by the piles 58 to a position where the sails are normally disposed to the direction of the wind when the sails are in a first position as shown in FIG. 1.

The force of the wind acting upon the sails when in the first position will cause the elongate hollow body E to rock clockwise about center line 78 as viewed in FIG. 1. The masts and sails 130 and 132 are disposed to the right of center line 78 as viewed in FIG. 1, with the weight of the masts and sails 130 and 132 being offset by the counterweight 96 that is disposed to the left of center line 78 as viewed in FIG. 4.

The vane 126 and the supporting structure therefor is longitudinally offset to the mast 130 and sail 132 mast adjacent thereto to permit this sail to a second position in which the sail is substantially parallel to the direction of the wind.

In operation the force of the wind on the sails 132 will pivot the buoyant vessel clockwise as viewed in FIG. 1 until the weight of the counterweight 98 that is now being moved upwardly counter acts any further movement and the buoyant body E, masts 130 and sails 132 are in a first position. A conventional sensing assembly (not shown) that is associated with the power driven hydraulic pump assembly causes hydraulic fluid under pressure to be discharged through conduit 148 to cylinder 142 and withdraw through conduit 147. Piston rod 140 moves to the left as viewed in FIG. 3 and in so doing pivots masts 130 and sails 132 to second positions where the sails are substantially parallel to the wind. The counterweight 98 now causes the buoyant body E to pivot to the left about center line 78 as viewed in FIG. 4 to a second position. The movement to the second position terminates when the weight of the masts 130 and sails 132 counterbalances the weight of the counterweight 98. The sensing means (not shown) now causes hydraulic fluid to be discharged through conduit 147 and withdrawn through conduit 148 to so move the actuating member 133 that the lugs 131 are pivoted from the position shown in phantom line in FIG. 3 to that shown in solid line in the same figure. The masts 130 and sails 132 are disposed in first positions, with the wind exerting a force on the sails to return them to the first position where the cycle is again repeated.

As the buoyant body E rocks about the center line 78 as above described the eccentric rod 88 moves relative to the roller supporting frame 82 and in so doing reciprocates the actuating member 44 vertically. Such reciprocation causes alternate elongation and shortening of the bellows D, as the bellows D elongate a negative pressure is created in enclosure B with first check valve 32 opening and second check valve closing to draw water into the confines of the enclosure. The bellows D as it shortens subjects water in enclosure D to pressure, with first check valve closing and second check valve 34 opening to cause water to discharge upwardly to reservoir G. Water discharges from reservoir G by gravity to drive turbine 40, and is then returned to the body of water C.

From the above description it will be apparent that the buoyant ring 60 rotates within the pen defined by the piles 58 due to the action of the wind on vane 126. Due to the pivotal connections 112a and 114a the frame F may pivot either to the left or right as viewed in FIG. 2 relative to ring 60. Also, the buoyant body E may pivot about the longitudinal axis 78, due to stub shafts 108 being rotatably connected to frame F as shown in FIG. 2. As the buoyant body E rocks on the longitudinal axis 78 the slide assembly 123 has the rails 120 and 122 move relative thereto.

The use and operation has been described previously in detail and need not be repeated.

What is claimed is:

1. In combination with a body of water having a bottom and a shore line, an elevated water reservoir on said shore line to receive water, a water discharge line extending downwardly from said reservoir through which water flows by gravity, water actuated power generating means connected to said discharge line to receive water therefrom and generate power as a result thereof, a wind actuated assembly for supplying water to said reservoir;
   a. a plurality of piles driven into said bottom adjacent said shore that define a pen that is filled with water to the same elevation as that of said body of water;
   b. a buoyant ring in said pen that may rotate and move vertically relative to said piles;
   c. a rigid generally rectangular frame disposed within said ring;
   d. first transversely disposed means that pivotally connect said frame to said ring;
   e. an elongate buoyant body disposed within said frame, said buoyant body having a longitudinal center line;
   f. second means that pivotally connect said buoyant body to said rectangular frame to permit said buoyant body to rock relative to said longitudinal axis;
   g. at least one vertically disposed vane operatively associated with said buoyant body, said vane when subjected to wind concurrently rotating said buoyant ring, rectangular frame and said buoyant body relative to said piles that said vane is disposed substantially parallel to the direction of said wind;
   h. at least one mast pivotally supported from said buoyant body and extending upwardly therefrom, said mast located outwardly a first distance from said center line;
   i. a sail rigidly secured to said mast;
   j. a counterweight on said buoyant body located outwardly from said center line a distance sufficient to compensate for the weight of said mast and sail;
   k. an enclosure assembly disposed below the surface of said body of water that includes a first check valve that opens and allows water to enter said enclosure assembly only when a negative pressure is formed therein, a second check that opens and allows water to discharge from said enclosure assembly only when a positive pressure is formed therein, a vertically deformable bellows that extends upwardly from said enclosure assembly, said bellows creating a negative pressure in said enclosure assembly as it lengthens longitudinally and a positive pressure when it is shortened longitudinally;
   l. third means for alternatively shortening and lengthening said bellows as said buoyant body pivots on said longitudinal axis;
   m. a water supply conduit connected to said second check valve for delivering water to said reservoir; and
   n. power operated, tilt sensing means that rotate said mast from a first position where said sail is in a first position substantially normal to the direction of said wind when said buoyant body has pivoted to a first position where the weight of said counterweight as it moves upwardly relative to said center line counteracts the weight of said mast and sail and the force of said wind on the latter to a second position where said sail is substantially parallel to the direction of said wind, with said buoyant body, mast and sail due to the weight of said counterweight pivoting about said center line to a second position as said counter weight moves downwardly relative to said center line, with said power operated, tilt sensing means at said second position pivoting said mast and sail to said first position to again complete the cycle in which said buoyant body alternally pivots in opposite directions about said center line.

2. A wind actuated assembly as defined in claim 1 which in addition includes;
   o. an arcuate rail that extends upwardly from said buoyant body;
   p. a slide assembly movably mounted on said rail and secured to said vane; and
   q. fourth means for also securing said vane to said first means.

3. An assembly as defined in claim 1 in which said third means includes;
   o. a rigid plate secured to the upper extremity of said bellows;
   p. a transverse, arcuate, eccentrically disposed member that extends downwardly from said buoyant body;
   q. a rigid actuating member that extends upwardly from said plate to terminate in an upper end; and
   r. fourth means mounted on said upper end of said actuating member that movably engage said eccentrically disposed member as said buoyant body rocks about said longitudinal axis thereof.

4. An assembly as defined in claim 3 which in addition includes;
   s. guide means within said body and enclosure assembly for maintaining said actuating member coaxially and vertically aligned with a vertical axis of said bellows.

* * * * *